United States Patent
Sheridan et al.

(10) Patent No.: US 10,584,660 B2
(45) Date of Patent: Mar. 10, 2020

(54) GEARED TURBOMACHINE FAN AND COMPRESSOR ROTATION

(71) Applicant: United Technologies Corporation, Farmington, CT (US)

(72) Inventors: William G. Sheridan, Southington, CT (US); Michael E. McCune, Colchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 230 days.

(21) Appl. No.: 15/411,459

(22) Filed: Jan. 20, 2017

(65) Prior Publication Data

US 2017/0130673 A1    May 11, 2017

Related U.S. Application Data

(63) Continuation of application No. 13/356,940, filed on Jan. 24, 2012, now abandoned.

(51) Int. Cl.
*F02K 3/06* (2006.01)
*F02C 7/36* (2006.01)
(Continued)

(52) U.S. Cl.
CPC .............. *F02K 3/06* (2013.01); *F01D 25/168* (2013.01); *F02C 7/36* (2013.01); *F04D 29/522* (2013.01);
(Continued)

(58) Field of Classification Search
CPC .. F02K 3/06; F02C 3/107; F02C 3/113; F02C 7/36; F05D 2220/36; F05D 2260/40311
See application file for complete search history.

(56) References Cited

U.S. PATENT DOCUMENTS 3,194,487 A    7/1965   Tyler et al.
3,287,906 A    11/1966  McCormick
(Continued)

FOREIGN PATENT DOCUMENTS

EP    1227255    7/2002
EP    1921290    5/2008
(Continued)

OTHER PUBLICATIONS

Honeywell LF507. Jane's Aero-engines, Aero-engines—Turbofan. Feb. 9, 2012.
(Continued)

*Primary Examiner* — Arun Goyal
(74) *Attorney, Agent, or Firm* — Carlson, Gaskey & Olds, P.C.

(57) ABSTRACT

An exemplary gas turbine engine includes a fan section including a fan rotor and at least one fan blade. A fan pressure ratio across the at least one fan blade is less than 1.45, noninclusive of the pressure across any fan exit guide vane system. The engine further includes a low-pressure compressor having a low-pressure compressor rotor that rotates together with the fan rotor at a common speed in operation, and a geared architecture that drives the low-pressure compressor rotor and the fan rotor. The geared architecture has a gear reduction ratio of greater than 2.5. The engine further includes a high-pressure compressor having a pressure ratio greater than 20, a low-pressure turbine having a pressure ratio greater than 5, and a bypass ratio greater than 10.

20 Claims, 1 Drawing Sheet

(51) Int. Cl.
  *F01D 25/16* (2006.01)
  *F04D 29/52* (2006.01)
(52) U.S. Cl.
  CPC .............. *F05D 2220/36* (2013.01);
          *F05D 2260/40311* (2013.01)

(56) References Cited

U.S. PATENT DOCUMENTS

| | | |
|---|---|---|
| 3,729,957 A | 5/1973 | Petrie et al. |
| 3,747,343 A | 7/1973 | Rosen |
| 3,754,484 A | 8/1973 | Roberts |
| 3,892,358 A | 7/1975 | Gisslen |
| 3,932,058 A | 1/1976 | Harner et al. |
| 3,935,558 A | 1/1976 | Miller et al. |
| 4,130,872 A | 12/1978 | Harloff |
| 5,433,674 A | 7/1995 | Sheridan et al. |
| 5,447,411 A | 9/1995 | Curley et al. |
| 5,524,847 A | 6/1996 | Brodell et al. |
| 5,778,659 A | 7/1998 | Duesler et al. |
| 5,857,836 A | 1/1999 | Stickler et al. |
| 5,915,917 A | 6/1999 | Eveker et al. |
| 5,975,841 A | 11/1999 | Lindemuth et al. |
| 6,223,616 B1 | 5/2001 | Sheridan |
| 6,318,070 B1 | 11/2001 | Rey et al. |
| 6,464,401 B1 | 10/2002 | Allard |
| 6,607,165 B1 | 8/2003 | Manteiga et al. |
| 6,732,502 B2 | 5/2004 | Seda et al. |
| 6,814,541 B2 | 11/2004 | Evans et al. |
| 7,021,042 B2 | 4/2006 | Law |
| 7,328,580 B2 | 2/2008 | Lee et al. |
| 7,591,754 B2 | 9/2009 | Duong et al. |
| 7,806,651 B2 | 10/2010 | Kennepohl et al. |
| 7,824,305 B2 | 11/2010 | Duong et al. |
| 7,882,693 B2 | 2/2011 | Schilling |
| 7,926,260 B2 | 4/2011 | Sheridan et al. |
| 7,950,237 B2* | 5/2011 | Grabowski .............. F01D 21/04 60/226.1 |
| 7,966,806 B2 | 6/2011 | Henry et al. |
| 7,997,868 B1 | 8/2011 | Liang et al. |
| 8,074,440 B2* | 12/2011 | Kohlenberg ........... B64D 33/04 60/226.1 |
| 8,166,748 B2 | 5/2012 | Schilling |
| 8,205,432 B2 | 6/2012 | Sheridan |
| 8,672,801 B2* | 3/2014 | McCune ............... F01D 25/164 475/331 |
| 2008/0003096 A1 | 1/2008 | Kohli et al. |
| 2008/0098716 A1* | 5/2008 | Orlando ................. F01D 15/12 60/226.1 |
| 2008/0120839 A1 | 5/2008 | Schilling |
| 2008/0149445 A1 | 6/2008 | Kern et al. |
| 2008/0190095 A1 | 8/2008 | Baran |
| 2009/0056343 A1 | 3/2009 | Suciu et al. |
| 2009/0081035 A1 | 3/2009 | Merry et al. |
| 2009/0090096 A1 | 4/2009 | Sheridan |
| 2009/0314881 A1 | 12/2009 | Suciu et al. |
| 2010/0148396 A1 | 6/2010 | Xie et al. |
| 2010/0331139 A1 | 12/2010 | McCune |
| 2011/0056208 A1 | 3/2011 | Norris et al. |
| 2011/0130256 A1 | 6/2011 | McCune et al. |
| 2011/0159797 A1 | 6/2011 | Beltman et al. |
| 2011/0293423 A1 | 12/2011 | Bunker et al. |
| 2012/0124964 A1 | 5/2012 | Hasel et al. |

FOREIGN PATENT DOCUMENTS

| | | |
|---|---|---|
| GB | 1516041 | 6/1978 |
| GB | 2041090 | 9/1980 |
| WO | 2007038674 | 4/2007 |

OTHER PUBLICATIONS

Honeywell TFE731. Jane's Aero-engines, Aero-engines—Turbofan. Jul. 18, 2012.

NASA Conference Publication. Quiet, powered-lift propulsion. Cleveland, Ohio. Nov. 14-15, 1978. pp. 1-420.

"Civil Turbojet/Turbofan Specifications", Jet Engine Specification Database (Apr. 3, 2005).

Kandebo, S.W. (1993). Geared-turbofan engine design targets cost, complexity. Aviation Week & Space Technology, 148(8). Start p. 32.

Hendricks, E.S. and Tong, M.T. (2012). Performance and weight estimates for an advanced open rotor engine. NASA/TM-2012-217710. pp. 1-13.

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.

Zalud, T. (1998). Gears put a new spin on turbofan performance. Machine Design, 70(20), p. 104.

Kurzke, J. (2008). Preliminary Design, Aero-engine design: From state of the art turbofans towards innovative architectures. pp. 1-72.

Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.

Han, J., Dutta, S., and Ekkad, S.V. (2000). Gas turbine heat transfer and cooling technology. New York, NY: Taylor & Francis. pp. 1-25, 129-157, and 160-249.

Mattingly, J.D. (1996). Elements of gas turbine propulsion. New York, New York: McGraw-Hill, Inc. pp. 1-18, 50-62, 85-87, 95-104, 121-123, 223-234, 242-245, 278-280, 303-309, 323-326, 462-479, 517-520, 563-565, 673-675, 582-685, 697-699, 703-705, 802-805, 862-864, and 923-925.

Declaration of Reza Abhari, Ph.D. In re U.S. Pat. No. 8,844,265. Executed Jun. 28, 2016. pp. 1-91.

Declaration of John Eaton, Ph.D. In re U.S. Pat. No. 8,869,568. Executed Mar. 28, 2016. pp. 1-87.

Declaration of Reza Abhari. In re U.S. Pat. No. 8,695,920. Executed Nov. 30. pp. 1-67.

Declaration of Reza Abhari. In re U.S. Pat. No. 8,448,895. Executed Nov. 28. pp. 1-81.

Declaration of Reza Abhari. In re U.S. Pat. No. 8,695,920, claims 1-4, 7-14, 17 and 19. Executed Nov. 29. pp. 1-102.

Declaration of Dr. Magdy Attia. In re U.S. Pat. No. 8,313,280. Executed Oct. 21, 2016. pp. 1-88.

Lord, W.K., MacMartin, D.G., and Tillman, T.G. (2000). Flow control opportunities in gas turbine engines. American Institute of Aeronautics and Astronautics. pp. 1-15.

Daly, M. Ed. (2010). Jane's Aero-Engine. Issue Twenty-seven. Mar. 2010. p. 633-636.

Roux, E. (2007). Turbofan and turbojet engines database handbook. Editions Elodie Roux. Blagnac: France. pp. 1-595.

Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.

Declaration of Dr. Magdy Aftia. In re U.S. Pat. No. 8,517,668. Executed Dec. 8, 2016. pp. 1-81.

Cramoisi, G. Ed. (2012). Death in the Potomac: The crash of Air Florida Flight 90. Air Crash Investigations. Accident Report NTSB/AAR-82-8. p. 45-47.

Norton, M. and Karczub, D. (2003). Fundamentals of noise and vibration analysis for engineers. Press Syndicate of the University of Cambridge. New York: New York. p. 524.

U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.

U.S. Department of Transportation: Federal Aviation Administration Advisory Circular. Standard operating procedures for flight deck crewmembers. Dated: Feb. 27, 2003 . . . p. 1-6 and Appendices.

European Search Report for Application No. 16171498.5 dated Sep. 6, 2016.

Kjelgaard, Chris, Gearing up for the GTF, Aircraft Technology, p. 86-95, Issue 105.

Pratt & Whitney, PurePower Engine—This Changes Everything, p. 4-6, Digital Press Kit.

(56) References Cited

OTHER PUBLICATIONS

Extended European Search Report for Application No. 13774928.9.
International Preliminary Report for Patentability for PCT Application No. PCT/US2013/021681 dated Aug. 7, 2014.
International Search Report and Written Opinion for International Application No. PCT/US2013/021681 completed on Sep. 11, 2013.
McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009, Orlando, Florida. pp. 145-153.
Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.
Carney, K., Pereira, M. Revilock, and Matheny, P. (2003). Jet engine fan blade containment using two alternate geometries. 4th European LS-DYNA Users Conference. pp. 1-10.
Brines, G.L. (1990). The turbofan of tomorrow. Mechanical Engineering: The Journal of the American Society of Mechanical Engineers,108(8), 65-67.
Faghri, A. (1995). Heat pipe and science technology. Washington, D.C.: Taylor & Francis. pp. 1-60.
Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modern Machine Shop. Retrieved from: http://www.mmsonline.com/articles/composite-fan-blade-containment-case pp. 1-4.
Hall, C.A. and Crichton, D. (2007). Engine design studies for a silent aircraft. Journal of Turbomachinery, 129, 479-487.
Hague, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.
Brennan, P.J. and Kroliczek, E.J. (1979). Heat pipe design handbook. Prepared for National Aeronautics and Space Administration by B & K Engineering, Inc. Jun. 1979. pp. 1-348.
Horikoshi, S. and Serpone, N. (2013). Introduction to nanoparticles. Microwaves in nanoparticle synthesis. Wiley-VCH Verlag GmbH & Co. KGaA. pp. 1-24.
Kerrebrock, J.L. (1977). Aircraft engines and gas turbines. Cambridge, MA: The MIT Press. p. 11.
Xie, M. (2008). Intelligent engine systems: Smart case system. NASA/CR-2008-215233. pp. 1-31.
Knip, Jr., G. (1987). Analysis of an advanced technology subsonic turbofan incorporating revolutionary materials. NASA Technical Memorandum. May 1987. pp. 1-23.
Willis, W.S. (1979). Quiet clean short-haul experimental engine (QCSEE) final report. NASA/CR-159473 pp. 1-289.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Ramsden, J.M. (Ed). (1978). The new European airliner. Flight International, 113(3590). Jan. 7, 1978. pp. 39-43.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Oates, G&C. (Ed.) (1989). Aircraft propulsion systems and technology and design. Washington, D.C.: American Institute of Aeronautics, Inc. pp. 341-344.
Lau, K., Gu, C., and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc. pp. 145, 355-358.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc. pp. 8-15.
Pyrograf-III Carbon Nanofiber. Product guide. Retrieved Dec. 1, 2015 from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc. Oct. 2004.
Ratna, D. (2009). Handbook of thermoset resins. Shawbury, UK: iSmithers. pp. 187-216.
Wendus, B.E., Stark, D.F., Holler, R.P., and Funkhouser, M.E. (2003). Follow-on technology requirement study for advanced subsonic transport. NASA/CR-2003-212467. pp. 1-37.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Merriam-Webster's collegiate dictionary, 11th Ed. (2009). p. 824.
Merriam-Webster's collegiate dictionary, 10th Ed. (2001). p. 1125-1126.
Hughes, C. (2010). Geared turbofan technology. NASA Environmentally Responsible Aviation Project. Green Aviation Summit. NASA Ames Research Center. Sep. 8-9, 2010. pp. 1-8.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Moxon, J. How to save fuel in tomorrow's engines. Flight International. Jul. 30, 1983. 3873(124). pp. 272-273.
File History for U.S. Appl. No. 12/131,876.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Gunston, B. (Ed.) (2000). Jane's aero-engines, Issue seven. Coulsdon, Surrey, UK: Jane's Information Group Limited. pp. 510-512.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Whitaker, R. (1982). ALF 502: plugging the turbofan gap. Flight International, p. 237-241, Jan. 30, 1982.
Munt, R. (1981). Aircraft technology assessment: Progress in low emissions engine. Technical Report. May 1981. pp. 1-171.
Waters, M.H. and Schairer, E.T. (1977). Analysis of turbofan propulsion system weight and dimensions. NASA Technical Memorandum. Jan. 1977. pp. 1-65.
Avco Lycoming Divison. ALF 502L Maintenance Manual. Apr. 1981. pp. 1-118.
Type Certificate Data Sheet No. E6NE. Department of Transportation Federal Aviation Administration. Jun. 7, 2002. pp. 1-10.
Trembley, Jr., H.F. (1977). Determination of effects of ambient conditions on aircraft engine emissions. Prepared for Environmental Protection Agency. Ann Arbor, Michigan. Sep. 1977 pp. 1-256.
Honeywell LF502. Jane's Aero-engines, Aero-engines—Turbofan. Feb. 9, 2012.
Honeywell LF502. Jane's Aero-engines, Aero-engines—Turbofan. Aug. 17, 2016.

(56) References Cited

OTHER PUBLICATIONS

Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Rauch, D. (1972). Design study of an air pump and integral lift engine ALF-504 using the Lycoming 502 core. Prepare for NASA. Jul. 1972. pp. 1-182.
Dassault Falcon 900EX Easy Systems Summary. Retrieved from: http://www.smartcockpit.com/docs/F900EX-Engines.pdf pp. 1-31.
Honeywell TFE731 Pilot Tips. pp. 1-143.
Honeywell TFE731-5AR to -5BR Engine Conversion Program. Sep. 2005. pp. 1-4.
Garret TFE731 Turbofan Engine (CAT C). Chapter 79: Lubrciation System. TTFE731 Issue 2. 2010. pp. 1-24.

\* cited by examiner

GEARED TURBOMACHINE FAN AND COMPRESSOR ROTATION

CROSS-REFERENCE TO RELATED APPLICATIONS

This application is a continuation of U.S. patent application Ser. No. 13/356,940, which was filed on 24 Jan. 2012 and is incorporated herein by reference.

BACKGROUND

This disclosure relates to a geared turbomachine having a compressor rotor and a fan rotor that rotate together.

Turbomachines, such as gas turbine engines, typically include a fan section, a turbine section, a compressor section, and a combustor section. Turbomachines may employ a geared architecture connecting the fan section and the turbine section. The compressor section typically includes at least a high-pressure compressor and a low-pressure compressor. The compressors include rotors that rotate separately from a rotor of fan. To maximize performance of such turbomachines, various recent engine architectures have been proposed in which the fan rotates in a first direction and at a first speed as compared to a low-pressure compressor which rotates in the opposite direction and at a higher speed. These recent engine architectures can also be improved.

SUMMARY

A high-bypass ratio geared turbomachine according to an exemplary aspect of the present disclosure comprises a compressor section of a high-bypass ratio geared turbomachine, the compressor section providing at least a low-pressure compressor and a high-pressure compressor, wherein a rotor of the low-pressure compressor rotates together with a rotor of a fan.

In a further non-limiting embodiment of any of the foregoing high-bypass ratio geared turbomachine embodiments, the rotor of the low-pressure compressor and the rotor of the fan may rotate at the same speed and in the same direction.

In a further non-limiting embodiment of any of the foregoing high-bypass ratio geared turbomachine embodiments, the high-bypass ratio geared turbomachine may have a fan bypass ratio greater than about 8.

In a further non-limiting embodiment of any of the foregoing high-bypass ratio geared turbomachine embodiments, the high-bypass ratio geared turbomachine may have an overall compression ratio greater than about 40.

In a further non-limiting embodiment of any of the foregoing high-bypass ratio geared turbomachine embodiments, the high-pressure compressor may have a pressure ratio greater than about 20.

In a further non-limiting embodiment of any of the foregoing high-bypass ratio geared turbomachine embodiments, the fan may include a shaft that is rotatably supported by a plurality of tapered bearings.

In a further non-limiting embodiment of any of the foregoing high-bypass ratio geared turbomachine embodiments, the high-bypass ratio geared turbomachine may include a turbine shaft that rotates a geared architecture to rotate the rotor of the low-pressure compressor and the rotor of the fan.

In a further non-limiting embodiment of any of the foregoing high-bypass ratio geared turbomachine embodiments, at least one thrust bearing may rotatably support the turbine shaft, and the at least one thrust bearing may be located axially between the geared architecture and a turbine secured to the turbine shaft.

In a further non-limiting embodiment of any of the foregoing high-bypass ratio geared turbomachine embodiments, the at least one thrust bearing may be a bi-directional tapered bearing.

In a further non-limiting embodiment of any of the foregoing high-bypass ratio geared turbomachine embodiments, the shaft may be a low-pressure turbine shaft.

In a further non-limiting embodiment of any of the foregoing high-bypass ratio geared turbomachine embodiments, the geared architecture may be a planetary geared architecture.

A high-bypass ratio turbomachine according to another exemplary aspect of the present disclosure comprises a fan rotor that rotates together with an compressor rotor at a first speed in a turbomachine having a high-bypass ratio, wherein the fan rotor and the compressor rotor are driven by a shaft that rotates at a second speed different than the first speed.

In a further non-limiting embodiment of any of the foregoing high-bypass ratio geared turbomachine embodiments, the shaft may rotate a geared architecture to rotate the fan rotor and the compressor rotor.

In a further non-limiting embodiment of any of the foregoing high-bypass ratio geared turbomachine embodiments, the compressor rotor may be axially forward of a fan frame extending radially across a fan bypass flow path.

In a further non-limiting embodiment of any of the foregoing high-bypass ratio geared turbomachine embodiments, the fan rotor and the compressor rotor may rotate at the same speed.

In a further non-limiting embodiment of any of the foregoing high-bypass ratio geared turbomachine embodiments, the high-bypass ratio geared turbomachine may include a high-pressure turbine, a combustor section, and a low-pressure turbine arranged axially sequentially within the geared turbomachine.

In a further non-limiting embodiment of any of the foregoing high-bypass ratio geared turbomachine embodiments, exclusively axial compressors may provide compression in the geared turbomachine.

In a further non-limiting embodiment of any of the foregoing high-bypass ratio geared turbomachine embodiments, the compressor may be a low-pressure compressor.

A method of operating a high-bypass ratio turbomachine according to an exemplary aspect of the present disclosure comprises rotating a geared architecture with a first shaft, rotating a second shaft with the geared architecture, and rotating a fan rotor and a compressor rotor with the second shaft.

In a further non-limiting embodiment of any of the foregoing methods of operating a high-bypass ratio geared turbomachine, the turbomachine may have a fan bypass ratio greater than 8.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
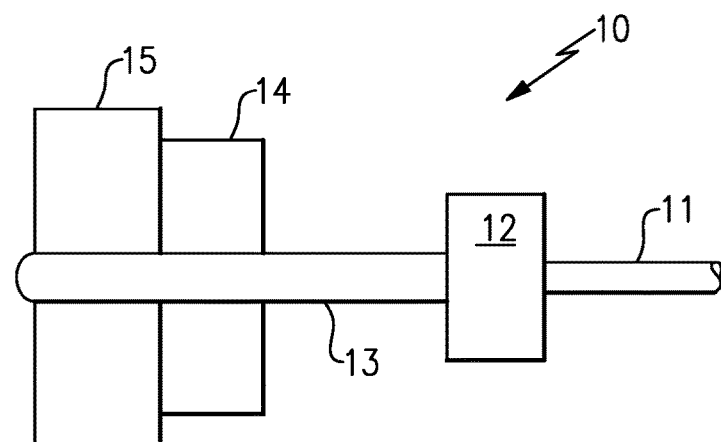
FIG. 1 shows a highly schematic view of a portion of an example turbomachine.

Referring to FIG. 1, an example geared turbomachine 10 includes a first shaft 11 that provides a rotating input to a geared architecture 12. Rotating the geared architecture 12 rotates a second shaft 13. The example geared architecture 12 has a gear ratio that causes the second shaft 13 to rotate at a slower speed than the first shaft 11.

A compressor rotor 14 and a fan rotor 15 are coupled to the second shaft 13. Rotating the second shaft 13 rotates the rotors 14 and 15 at the same rotational speed and in the same direction. In this example, the compressor rotor 14 forms a portion of an axial compressor.

Figure 2:
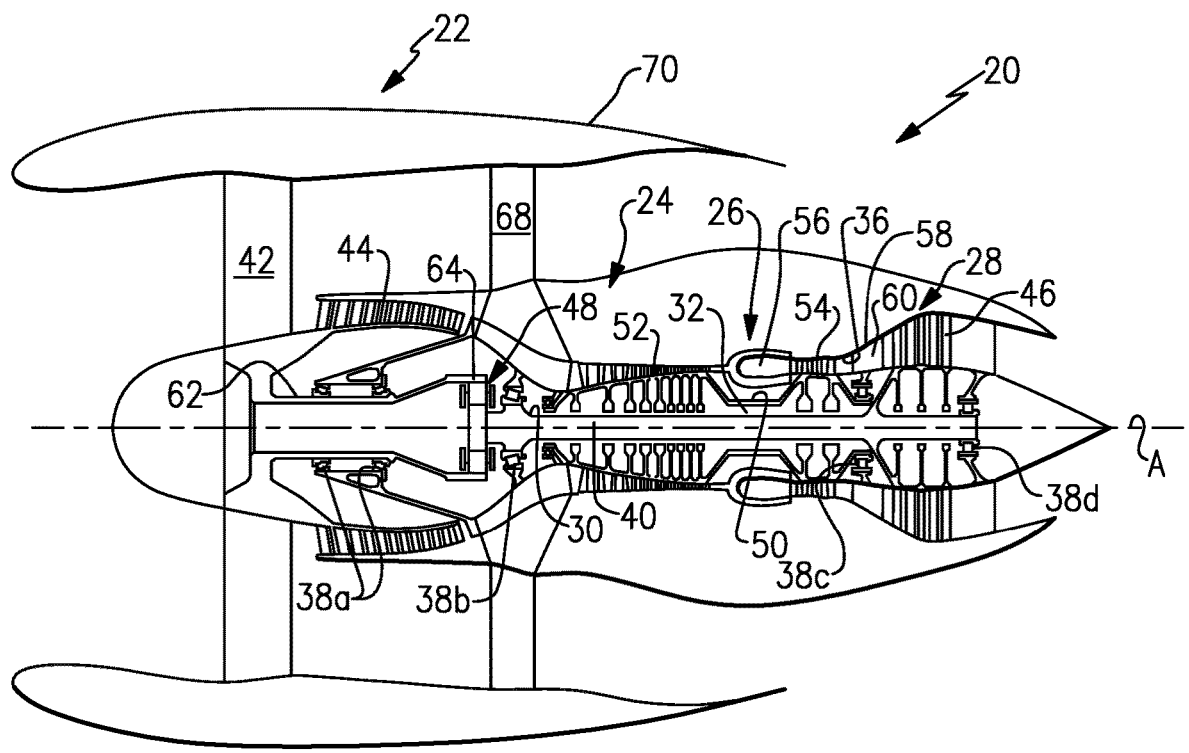
FIG. 2 shows a schematic view of another example turbomachine.

FIG. 2 schematically illustrates another example turbomachine, which is a gas turbine engine 20 in this example. The gas turbine engine 20 is a two-spool turbofan gas turbine engine that generally includes a fan section 22, a compressor section 24, a combustion section 26, and a turbine section 28. Other examples may include an augmentor section (not shown) among other systems or features.

In the example engine 20, the fan section 22 drives air along a bypass flowpath while the compressor section 24 drives air along a core flowpath. Compressed air from the compressor section 24 communicates through the combustion section 26. The products of combustion expand through the turbine section 28.

The example engine 20 generally includes a low-speed spool 30 and a high-speed spool 32 mounted for rotation about an engine central longitudinal axis A relative to an engine static structure 36.

Although depicted as a two-spool turbofan gas turbine engine in the disclosed non-limiting embodiment, it should be understood that the concepts described herein are not limited to use with turbofans. That is, the teachings may be applied to other types of turbomachines and turbine engines including three-spool architectures.

The low-speed spool 30 and the high-speed spool 32 are rotatably supported by several bearing systems 38a-38d. It should be understood that various bearing systems 38a-38d at various locations may alternatively, or additionally, be provided.

The low-speed spool 30 generally includes an inner shaft 40 that interconnects a geared architecture 48 and a low-pressure turbine rotor 46. The inner shaft 40 is a turbine shaft in this example as the inner shaft 40 is connected directly to the low-pressure turbine rotor 46. Rotating the geared architecture 48 rotatably drives a fan rotor 42 and a low-pressure compressor rotor 44 at a lower speed than the low-speed spool 30.

The high-speed spool 32 includes an outer shaft 50 that interconnects a high-pressure compressor rotor 52 and high-pressure turbine rotor 54.

In this example, the low-pressure compressor rotor 44 and the high-pressure compressor rotor 52 are both rotors of axial compressors, and there are no other types of compressors within the compressor section 24 of the engine 20.

The combustion section 26 includes a circumferentially distributed array of combustors 56 generally arranged axially between the high-pressure compressor rotor 52 and the high-pressure turbine rotor 54.

A mid-turbine frame 58 of the engine static structure 36 is generally arranged axially between the high-pressure turbine rotor 54 and the low-pressure turbine rotor 46. The mid-turbine frame 58 supports the bearing systems 38c and 38d in the turbine section 28. The mid-turbine frame 58 includes airfoils 60 within the path of the core airflow.

The inner shaft 40 and the outer shaft 50 are concentric and rotate via the bearing systems 38b-38d about the engine central longitudinal axis A, which is collinear with the longitudinal axes of the inner shaft 40 and the outer shaft 50.

In the example engine 20, the core airflow is compressed by the compressor section 24, mixed and burned with fuel in the combustors 56, then expanded within the turbine section 28. The high-pressure turbine rotor 54 and the low-pressure turbine rotor 46 rotatably drive the respective high-speed spool 32 and low-speed spool 30 in response to the expansion.

In some non-limiting examples, the engine 20 is a high-bypass geared aircraft engine. In a further example, the engine 20 has a fan bypass ratio that is greater than about six (6:1). In a still further example, the engine 20 has a fan bypass ratio that is greater than about eight (8:1). The overall compression ratio of such the example engine 20 is greater than 40 (40:1) in some examples, and the pressure ratio of the high-pressure compressor is greater than 20 (20:1).

The geared architecture 48 of the example engine 20 includes an epicyclic gear train, such as a planetary geared architecture or other geared architecture. The example epicyclic gear train has a gear reduction ratio of greater than about 2.3 (2.3:1).

The low-pressure turbine pressure ratio is pressure measured prior to inlet of low-pressure turbine as related to the pressure at the outlet of the low-pressure turbine (and prior to an exhausting from the engine 20). In one non-limiting embodiment, the bypass ratio of the engine 20 is greater than about ten (10:1), the fan diameter is significantly larger than that of the low-pressure compressor, and the low-pressure turbine has a pressure ratio that is greater than about 5 (5:1). The geared architecture 48 of this embodiment is an epicyclic gear train with a gear reduction ratio of greater than about 2.5 (2.5:1). Examples of the geared architecture 48 include star architectures and planetary architectures. It should be understood, however, that the above parameters are only exemplary of one embodiment of a geared architecture engine and that the present disclosure is applicable to other gas turbine engines including direct drive turbofans.

In some embodiments of the example engine 20, a significant amount of thrust is provided by the bypass flow B due to the high bypass ratio. The fan section 22 of the engine 20 is designed for a particular flight condition—typically cruise at about 0.8 Mach and about 35,000 feet. This flight condition, with the engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 (without the use of a Fan Exit Guide Vane system). The low Fan Pressure Ratio according to one non-limiting embodiment of the example engine 20 is less than 1.45 (1.45:1).

Low Corrected Fan Tip Speed is the actual fan tip speed divided by an industry standard temperature correction of "T"/$518.7^{0.5}$. T represents the ambient temperature in degrees Rankine. The Low Corrected Fan Tip Speed according to one non-limiting embodiment of the example engine 20 is less than about 1150 fps (351 m/s).

In the example engine 20, the fan rotor 42 and the low-pressure compressor rotor 44 are directly connected to a shaft 62. One axial end of the shaft 62 is directly connected to a carrier gear 64 of the geared architecture 48. The fan rotor 42 and the low-pressure compressor rotor 44 rotate at the same speed and in the same direction with the shaft 62 when the shaft 62 is driven by the carrier gear 64 of the geared architecture 48. The shaft 62 is rotated together with the carrier gear 64 when the geared architecture 48 is rotatably driven by the inner shaft 40 of the low-speed spool 30. The shaft 62 is considered a fan shaft in this example, because the fan rotor 42 is connected to the shaft 62.

Rotating the fan rotor 42 and the low-pressure compressor rotor 44 with the shaft 62 facilitates positioning the low-pressure compressor of the compressor section 24 relatively axially close to the fan section 22. The low-pressure compressor rotor 44 (and thus the low-pressure compressor) is axially forward of a fan frame 68 in this example. The fan frame 68 extends radially across a fan bypass passage of the engine 20. The fan frame 68 supports an outer duct 70 of the engine 20 relative to an engine core.

Bearings 38a rotatably support the shaft 62. The bearings 38a are tapered in this example. Tapered bearings mounted as shown in FIG. 2 will react to the fan 42 thrust loads as well as any radial or moment loads applied to shaft 62 which come from fan 42. In another example, bearings 38a can be a ball and roller bearing combination. This combination will also react any thrust, radial or moment loads from the fan 42 to the shaft 62. One skilled in the art and having the benefit of this disclosure may arrive at other bearing configurations that support reaction loads applied to shaft 62

Other bearings 38b rotatably support the low-speed spool 30 near the geared architecture 48. The bearings 38b are thrust bearings in this example. In one specific example, the bearings 38b are bi-directional tapered thrust bearings. In another specific example, the bearings 38b are ball thrust bearings.

Notably, the example bearings 38b are located axially between the geared architecture 48 and the low-pressure turbine rotor 46, and are positioned axially closer to the geared architecture 48 than the low-pressure turbine rotor 46.

Positioning the bearings 38b in this area has some performance advantages in the unlikely event that the inner shaft 40 fractures. After such a fracture of the inner shaft 40, axially displacing the low-pressure turbine rotor 46 relative to other portions of the engine 20 is often desired. The axial displacement after a fracture will cause the low-pressure turbine rotor 46 to desirably clash.

Fractures of the inner shaft 40 that are axially forward of the bearings 38b may not result in clash because the bearings 38b (which are thrust bearings) hold the axial position of the fractured portion. Positioning the bearings 38b axially near the geared architecture 48 increases the axial locations aft the bearings 38b, and thus the potential fracture locations of the inner shaft 40 that will result in clash. The bearing 38c and 38d, in this example, would permit axial displacement after a fracture.

In some examples, the torsional strength of the inner shaft 40 is less than the torsional strength of the other drive shaft within the engine 20 (including the geared architecture 48). Thus, in the event of, for example, an overload of the fan rotor 42, the inner shaft 40 will fail before other areas of the engine 20.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A gas turbine engine, comprising:
    a fan section including a fan rotor and at least one fan blade, with a fan pressure ratio across the at least one fan blade of less than 1.45, noninclusive of the pressure across any fan exit guide vane system;
    a low-pressure compressor having a low-pressure compressor rotor that rotates together with the fan rotor at a common speed in operation;
    a geared architecture that drives the low-pressure compressor rotor and the fan rotor, the geared architecture having a gear reduction ratio of greater than 2.5;
    a high-pressure compressor having a pressure ratio greater than 20;
    a low-pressure turbine having a pressure ratio greater than 5; and
    a bypass ratio greater than 10.

2. The gas turbine engine of claim 1, wherein the geared architecture is a planetary geared architecture.

3. The gas turbine engine of claim 2, further comprising a low corrected fan tip speed less than 1150 ft/second, wherein the low corrected fan tip speed is an actual fan tip speed at a temperature divided by $(T/518.7)^{0.5}$, where T represents the temperature in degrees Rankine.

4. The gas turbine engine of claim 3, further comprising a two-stage high-pressure turbine.

5. The gas turbine engine of claim 4, further comprising an engine overall compression ratio greater than 40.

6. The gas turbine engine of claim 5, further comprising a fan bypass passage and a fan frame extending radially across the fan bypass passage, wherein the low-pressure compressor is axially forward of the fan frame.

7. The gas turbine engine of claim 5, further comprising a low-speed spool that interconnects the geared architecture and the low-pressure turbine, and at least one bearing rotatably supporting the low-speed spool and positioned axially closer to the geared architecture between the geared architecture and the low-pressure turbine.

8. The gas turbine engine of claim 7, wherein the at least one bearing includes at least two bearings that are bi-directional tapered thrust bearings.

9. The gas turbine engine of claim 5, wherein the low-pressure turbine is a three-stage low-pressure turbine.

10. The gas turbine engine of claim 9, further comprising a fan bypass passage and a fan frame extending radially across the fan bypass passage, wherein the low-pressure compressor is axially forward of the fan frame.

11. The gas turbine engine of claim 5, wherein the high-pressure compressor is a nine-stage high-pressure compressor.

12. The gas turbine engine of claim 4, further comprising a low-speed spool that interconnects the geared architecture and the low-pressure turbine, and at least one bearing rotatably supporting the low-speed spool and positioned axially closer to the geared architecture between the geared architecture and the low-pressure turbine.

13. The gas turbine engine of claim 12, wherein the low-pressure turbine rotates an inner shaft, and the high-pressure compressor is rotated by an outer shaft, wherein a torsional strength of the inner shaft is less than a torsional strength of the outer shaft.

14. The gas turbine engine of claim 1, further comprising a two-stage high-pressure turbine.

15. The gas turbine engine of claim 14, wherein the geared architecture is positioned between the low-pressure compressor and the high-pressure compressor.

16. The gas turbine engine of claim 15, wherein the fan rotor and the low-pressure compressor rotor are directly connected to a fan shaft, and an axial end of the fan shaft is directly connected to a carrier gear of the geared architecture.

17. The gas turbine engine of claim 16, wherein the low-pressure turbine includes a low-pressure turbine rotor, and the low-pressure turbine drives the geared architecture through an inner shaft connected directly to the low-pressure turbine rotor.

18. The gas turbine engine of claim 17, wherein the fan shaft is rotatably supported by a plurality of tapered bearings.

19. The gas turbine engine of claim 15, wherein the low-pressure compressor includes a plurality of stages.

20. The gas turbine engine of claim 19, wherein each of the at least one fan blade is forward of the low-pressure compressor with respect to an engine central longitudinal axis.

\* \* \* \* \*